United States Patent [19]

Airheart

[11] Patent Number: 4,535,873
[45] Date of Patent: Aug. 20, 1985

[54] COMPACT HIGH PERFORMANCE DISC BRAKE

[75] Inventor: Franklin B. Airheart, Sacramento, Calif.

[73] Assignee: Alston Industries, Inc., Sacramento, Calif.

[21] Appl. No.: 523,154

[22] Filed: Aug. 15, 1983

[51] Int. Cl.³ .................. F16D 55/18; F16D 65/00
[52] U.S. Cl. .................. 188/72.4; 92/177; 188/73.32; 403/328
[58] Field of Search .......... 188/71.1, 71.3, 72.1, 188/72.4, 73.32, 151 R, 152; 92/177, 233; 192/70.13, 70.14, 85 C, 109 R; 403/328

[56] References Cited

U.S. PATENT DOCUMENTS

| | | | |
|---|---|---|---|
| 2,009,371 | 7/1935 | Junge | 403/328 |
| 3,220,512 | 11/1965 | Coatalen | 188/73.32 X |
| 3,590,961 | 7/1971 | Airheart | 188/73.4 |
| 3,610,375 | 10/1971 | Gilliland et al. | 188/71.8 |
| 3,690,413 | 9/1972 | Airheart | 188/67 |
| 3,690,417 | 9/1972 | Airheart | 188/71.8 |
| 3,701,398 | 10/1972 | Martins | 188/71.8 |
| 3,701,399 | 10/1972 | Airheart | 188/71.8 |
| 3,990,544 | 11/1976 | Vijan et al. | 188/72.4 |
| 4,004,661 | 1/1977 | Airheart et al. | 188/218 X |
| 4,120,386 | 10/1978 | Airheart | 192/70.13 |
| 4,159,754 | 7/1979 | Airheart | 188/71.8 |
| 4,180,146 | 12/1979 | Airheart | 188/71.8 |
| 4,384,554 | 5/1983 | Gotoda | 92/177 X |

FOREIGN PATENT DOCUMENTS

| | | | |
|---|---|---|---|
| 2900894 | 7/1979 | Fed. Rep. of Germany | 188/72.4 |
| 0075503 | 5/1961 | France | 403/328 |
| 2435630 | 5/1980 | France | 188/72.4 |
| 1096596 | 12/1967 | United Kingdom | 188/72.4 |

Primary Examiner—George E. A. Halvosa
Assistant Examiner—Robert J. Oberleitner
Attorney, Agent, or Firm—William W. Haefliger

[57] ABSTRACT

Caliper brake apparatus has a caliper housing, an actuator including a plunger movable axially longitudinally to urge a lining against a rotating disc, and the lining having the form of a plate which is laterally elongated and defines a plane generally perpendicular to said axis. The apparatus is improved by:

(a) the plunger having cross sections in planes normal to said axis and characterized as laterally elongated and as having lateral length dimensions which are substantially greater than the plunger transverse width dimension, the width dimension being generally normal to said axis and to said lateral length dimension, and (b) the actuator having a recess receiving the plunger, the recess having cross sections in planes normal to said longitudinal axis characterized as conforming in shape to said plunger cross sections.

In addition, one or more removable end plates may be employed to removably retain the lining in position.

10 Claims, 6 Drawing Figures

COMPACT HIGH PERFORMANCE DISC BRAKE

BACKGROUND OF THE INVENTION

This invention relates generally to disc brakes, and more particularly concerns the provision of a compact caliper assembly wherein braking force is more uniformly transmitted to disc engaging linings, and wherein such linings may be easily removed and replaced.

In conventional disc brake design, braking force is transmitted from a cylindrical plunger or plungers at one or opposite sides of the rotating disc to a lining or linings engageable with the disc. Lengthening of the lining to produce greater braking area is limited by the size of the plunger, since the plunger directly transmits force only to a cylindrical central portion of the lining. Therefore, to increase the direct force transmission path, the diameter of the plunger must be increased, which objectionably increases the overall size of the caliper assembly.

Further, in conventional disc brake structures, removal and replacement of the linings, as for example after wear, is made excessively difficult and time consuming due to the necessity to demount or disassemble much of the caliper assembly.

There is, accordingly, need for improvements to disc brakes which will overcome the above problems.

SUMMARY OF THE INVENTION

It is a major object of the invention to provide an improved caliper unit construction which will overcome the above described problems, and which will also simplify disc brake design as well as enable the provision of more compact assemblies without sacrifice of performance. Basically, the invention is embodied in brake apparatus having a caliper housing, an actuator including a plunger movable axially longitudinally to urge a lining against a rotating disc, the lining having the form of a plate which is laterally elongated and defines a plane generally perpendicular to the axis of plunger movement. In this environment, an important aspect of the invention concerns:

(a) the plunger having cross sections in planes normal to said axis and characterized as laterally elongated and as having lateral length dimensions which are substantially greater than the plunger transverse width dimension, said width dimension being generally normal to said axis and to said lateral width dimension, and (b) the actuator having a recess receiving the plunger, said recess having cross sections in planes normal to said longitudinal axis characterized as conforming in shape to the plunger cross sections.

More specifically, the plunger and recess may have kidney cross sections with peripheral convex curvature conforming generally to the convex periphery of the rotating disc. Accordingly, the plunger is enabled to have operative force transmitting engagement with an elongated lining along the major length of the lining, for enhanced direct force distribution to the elongated lining.

A further aspect of the invention concerns the provision of laterally spaced end plates carried by the housing to confine therebetween opposite ends of the lining or linings, at least one of the plates being removable to permit endwise removal and replacement of the lining or linings. As will appear, the elongated and curved linings may be supported at their mid-sections by body shoulders that permit forcible displacement of the linings by the plunger or plungers and which also permit endwise removal of worn linings and their replacement by new linings, after removal of one or both end plates.

These and other objects and advantages of the invention, as well as the details of an illustrative embodiment, will be more fully understood from the following description and drawings, in which:

DRAWING DESCRIPTION

DETAILED DESCRIPTION

Figure 1:
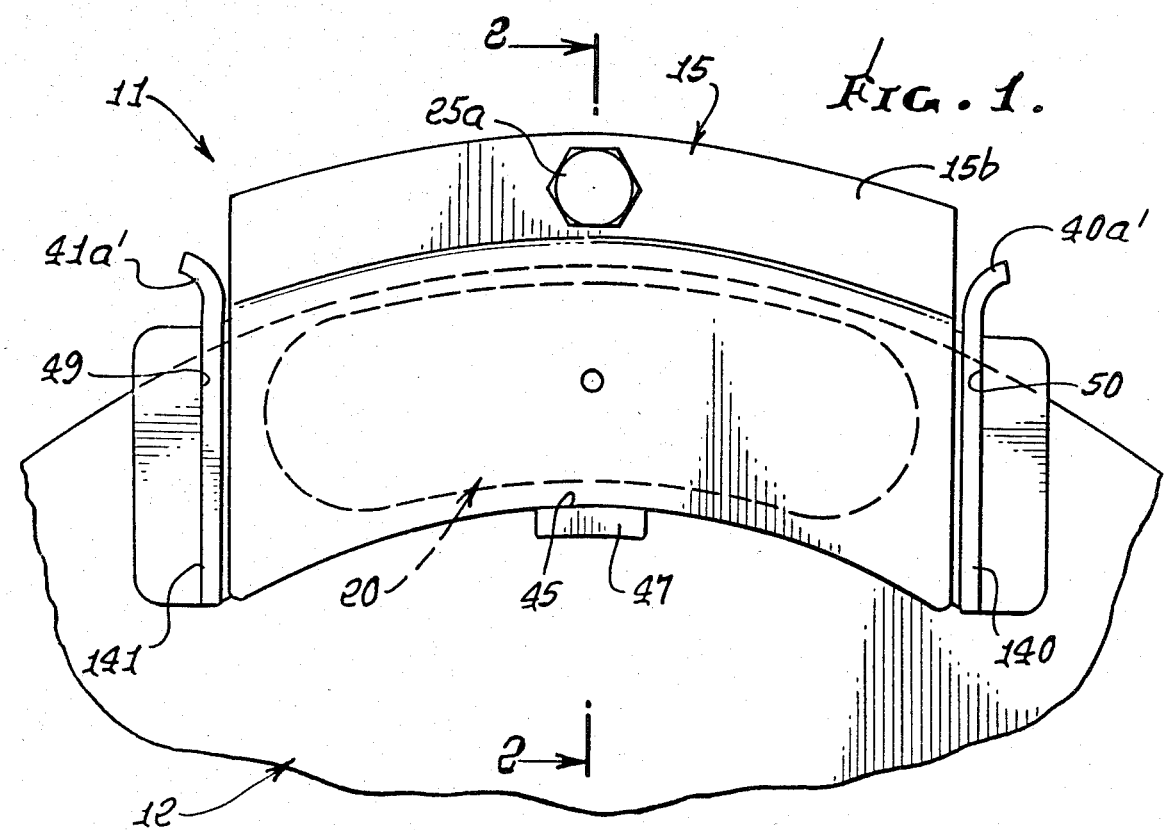
FIG. 1 is an elevation, in section, showing disc-brake structure incorporating the invention.
Figure 2:
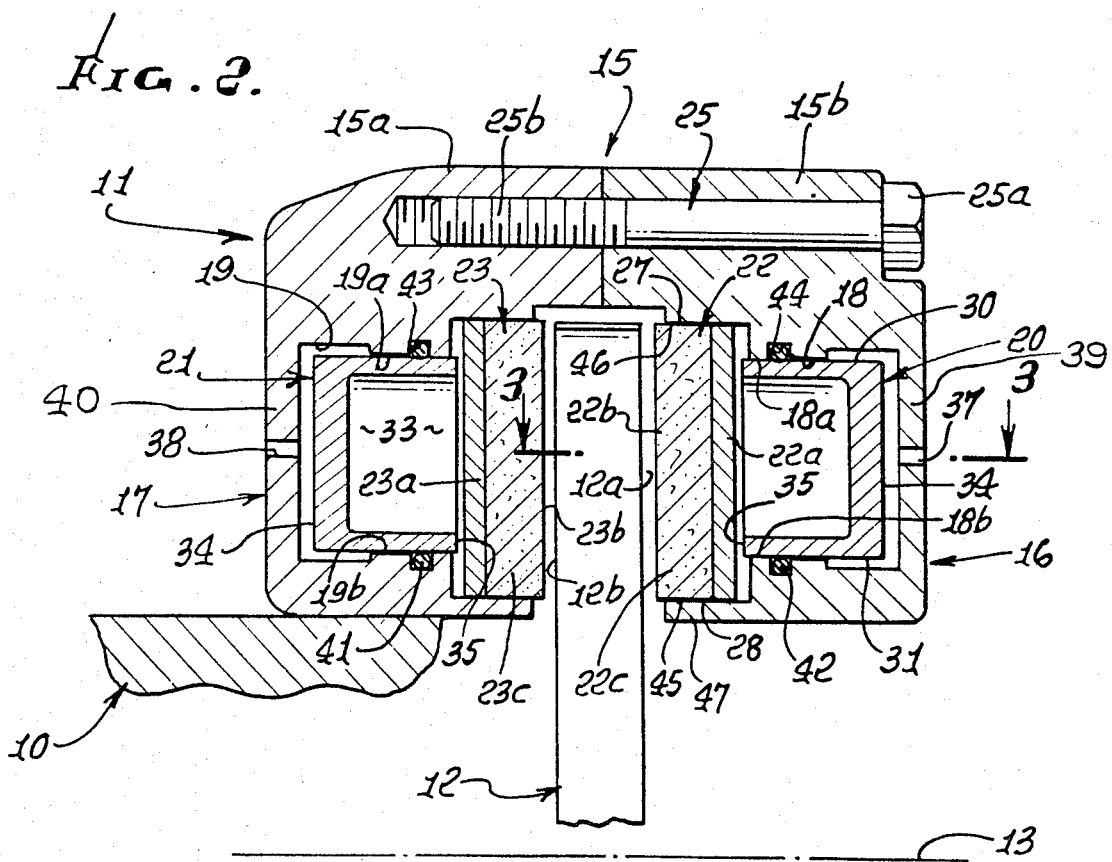
FIG. 2 is a vertical section taken on lines 2—2 of FIG. 1.
Figure 3:
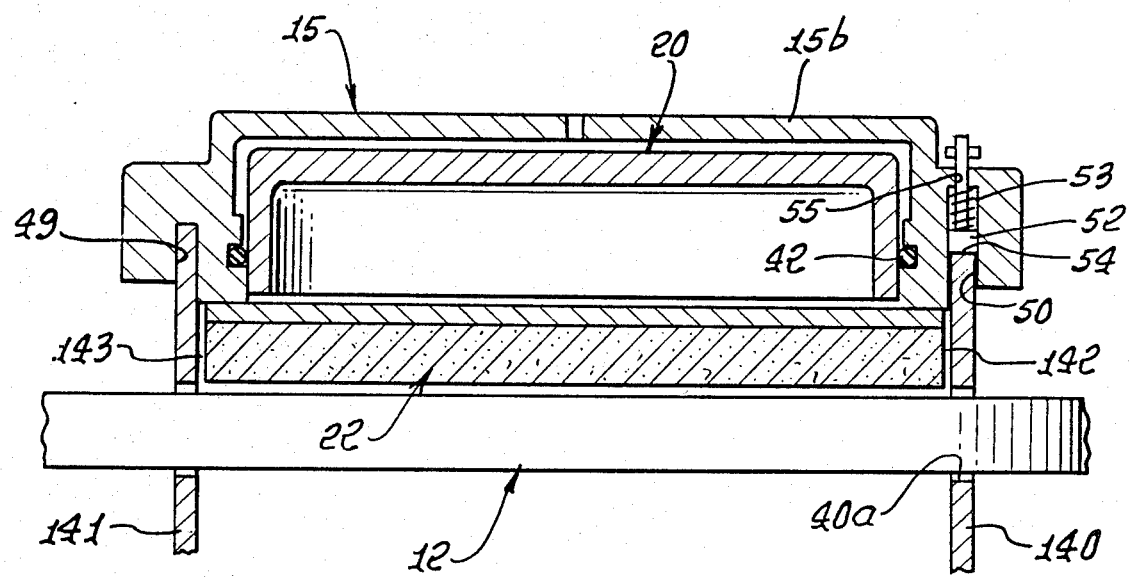
FIG. 3 is a plan view section taken on lines 3—3 of FIG. 2.

In FIGS. 1-3, a torque arm 10 carries caliper brake apparatus 11 for controllably braking a rotating disc 12 having an axis of rotation 13. The arm 10 may be suitably attached to vehicle or other structure. The disc has opposite faces 12a and 12b. Arm 10 may be at either side of disc 12.

The apparatus 11 includes a housing 15, and actuators 16 and 17 associated with the housing. The actuators have recesses 18 and 19 at opposite sides of the disc, and plungers 20 and 21 movable longitudinally axially in the recesses, parallel to axis 13, to urge brake linings 22 and 23 against the disc opposite sides. Plates 22a and 23a transmit force from the plungers to the linings, and are attached to the linings. The housing 15 may be formed in two sections 15a and 15b, interconnected by a fastener or fasteners 25 extending in an upper arm portion of the housing. Each fastener may comprise a bolt having a head 25a and a threaded shank 25b.

The linings 22 and 23 are typically laterally elongated, each having a convex other side 27 and a concave inner side 28 generally conforming in curvature to the curvature of the disc outer edge. The length of each lining is substantially greater than its transverse width.

In accordance with the invention, each plunger has a cross-section in planes normal to axis 13 and characterized as laterally elongated. The plunger lateral length dimension $P_l$ is substantially greater than the plunger transverse width dimension $P_w$. Each plunger typically also has an outer peripheral surface 30 facing away from axis 13 which is outwardly convex, and an inner peripheral surface 31 facing toward axis 13, which is concave. In addition, opposite ends 32 of each plunger are convexly curved. The plungers may furthermore be recessed as at 33, to lower their weight.

Plunger walls 34 receive hydraulic pressure exerted within the recesses to urge them toward the linings. The plunger edges 35 (having curvature conforming to that of peripheral surfaces 30, 31 and 32) are engageable with the plates 22a and 23a to urge the opposite sides 22b and 23b of the linings against the disc.

Figure 5:
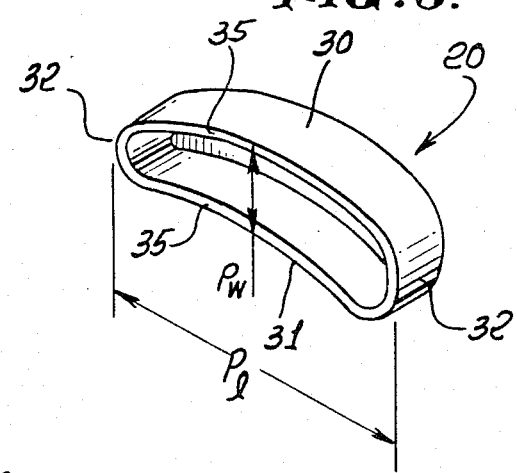
FIG. 5 is a perspective view of a plunger as employed in FIGS. 1-3 and FIG. 5a shows a modified plunger.
Figure 5A:
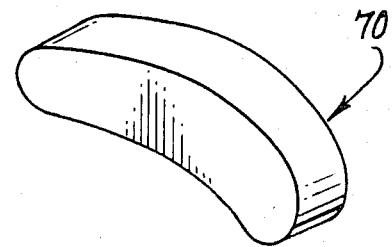

The FIG. 5a plunger 70 is like the FIG. 5 plunger, except that it is solid, i.e. not hollow.

It will be noted that the laterally elongated plungers, having "kidney" shaped cross sections typically extend laterally throughout the major lengths of the linings, and are generally centered relative to the linings, for transmitting force to the linings throughout their major lengths. Accordingly, the need for two or more actuators per lining is obivated, and good pressure distribution to the disc throughout the area of each lining is substantially enhanced.

Plunger walls 34 receive hydraulic pressure transmitted to the recesses as via ports 37 and 38 in the actuator walls 39 and 40. O-ring seals 41 and 42 are received in recesses 43 and 44 in the recess walls closely surrounding and conforming to the plunger peripheral surfaces 30-32. See recess walls 18a, 18b, 19a and 19b in FIG. 2, for example. To this end, ordinarily circular O-rings may be deformed to fit in the recesses 43 and 44 also having shapes conforming to the outer peripheral surfaces of the plungers, whereby the elastomeric O-rings seal off between the actuator recess walls and the plungers.

In accordance with a further aspect of the invention, the housing 11 removably supports the linings 22 and 23 in such manner as to facilitate ease of their removal and replacement. To this end, laterally spaced end plates 140 and 141 are carried by the housing to confine opposite ends 142 and 143 of the linings between the end plates. At least one and preferably both end plates are carried to permit their removal so as to in turn permit endwise removal of the linings. In this regard, while the linings are positioned between the end plates, their midportions, as at 22c and 23c are transversely confined between housing shoulders 45 and 46 which extend generally longitudinally and laterally. Note that shoulders 45 are located on tabs 47. Such support of the linings permits their free endwise removal and replacement (as for example along arcuate paths as enabled by the narrowness of the tabs 47) once one of the end plates 40 and 41 is removed.

Figure 4:
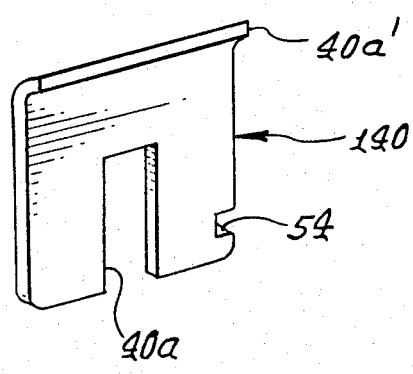
FIG. 4 is a side elevation showing a sliding plate.

The plates 40 and 41 are typically slidably received downwardly in slots 49 and 50 defined by the housing, and they may have tangs 40a' and 41a' to be manually grasped for inserting the plates into such slots, and for removing the plates from the slots. Retention means is also provided to releasably retain the plates in position (as shown in FIG. 1) in the slots. FIGS. 3 and 4 show one form of retention means having the form of a retainer pin 52 urged by compression spring 53 into a notch 54 in the side of plate 140. The pin is axially movable in a bore-hole 55 in the housing section 15b. To release the plate, the protruding end of the pin is retracted to remove the forward end of the pin from the notch 54, and the plate 140 is then lifted. Note that the plate is centrally slotted at 40a to enable the plate to straddle the disc, when the plate is positioned in the slot 50.

The second plate 141 is similarly retained in its slot 49. While the linings may be removed after withdrawal of one end plate, the provision of two removable end plates permits the application of force to the exposed ends of the linings, to drive them endwise free of the housing. Such plates therefore allow quick replacement of the linings, without disassembly of the caliper structure. The linings may be non-metallic.

I claim:
1. In caliper brake apparatus having a caliper housing, an actuator including a plunger having an axis and movable axially longitudinally to urge a lining against a rotating disc, the lining having the form of a plate which is laterally elongated and defining a plane generally perpendicular to said axis, the improvement combination comprising

(a) said plunger having cross sections in planes normal to said axis and characterized as laterally elongated and as having lateral length dimensions which are substantially greater than the plunger transverse width dimension, said width dimension being generally normal to said axis and to said lateral length dimension, and
(b) said actuator having a recess receiving said plunger, said recess having cross sections in planes normal to said longitudinal axis characterized as conforming in shape to said plunger cross sections, said plunger and recess cross sections having kidney shaped outlines,
(c) the housing removably supporting the lining, and including laterally spaced end plates carried by the housing and confining opposite ends of said lining therebetween, at least one end plate being removable to permit endwise removal and replacement of the lining, the housing defining at least one slot proximate ends of the lining and plunger and slidably receiving at least one of said end plates, with said end plate freely projecting outwardly of the slot and having an external tang for lift-out removal, relative to the slot, each slot and end plate extending inward sufficiently that the end plate faces substantially the entirety of the full end extent of the lining,
(d) the housing having transversely shaped shoulders defining at least one ledge spaced from the plunger and between which, portions of the lining between opposite ends of the lining, are loosely confined to accomodate endwise removal of the lining after removal of said removable end plate, but which also allows plunger actuated axial longitudinal displacement of the lining, said ledge being closer to the lining than the plunger.

2. The combination of claim 1 wherein said plunger and recess cross sections have peripheral convex curvature conforming generally to the peripheral convexity of said disc.

3. The combination of one of claims 1 or 2 wherein said plunger and recess cross sections extend laterally throughout the major lateral length of said lining.

4. The combination of one of claims 1 or 2 wherein said plunger has operative force transmitting relation with said lining and along the major lateral length of said lining.

5. The combination of one of claims 1 or 2 wherein said plunger has operative force transmitting relation with said lining and along the major lateral length of said lining, and including said lining, and housing supporting said lining and actuator.

6. The combination of claim 1 further including retention means to retain the plate in said slot.

7. The combination of claim 6 wherein said retention means includes a spring urged pin carried by the housing for releasable penetration into a notch formed by said plate.

8. The combination of claim 6 including a second lining carried by the housing and axially spaced from the first lining to receive the disc therebetween.

9. The combination of claim 8 wherein the second lining is also confined between said plates and is endwise removable after removal of said one plate from said slot.

10. The combination of claim 9 wherein another of said plates is removably received in a second slot defined by the housing.

* * * * *